United States Patent
Niedner et al.

[15] 3,696,520
[45] Oct. 10, 1972

[54] PROCESS AND DEVICE FOR THE TREATMENT OF MATERIAL

[72] Inventors: Peter Klaus Niedner, 8000 Munich 19, Sudliche Auffahrtsallee 70; Gerhard H. Diez, 8000 Munich 81, Freischutzstrasse 110/1308, both of Germany

[73] Assignee: said Niedner, by said Diez

[22] Filed: Jan. 6, 1970

[21] Appl. No.: 975

Related U.S. Application Data

[63] Continuation-in-part of Ser. No. 522,918, Jan. 25, 1966, abandoned.

[52] U.S. Cl. ..................................... 34/10, 263/21 A
[51] Int. Cl. ........................... F26b 3/08, F27b 15/10
[58] Field of Search .......... 23/1, 1 B, 126; 263/21 A; 34/10

[56] References Cited

UNITED STATES PATENTS

| | | |
|---|---|---|
| 2,935,840 | 5/1960 | Schoppe............23/182 V UX |
| 3,098,704 | 7/1963 | Schoppe.....................23/1 R |
| 3,211,538 | 10/1965 | Gross et al...............23/126 X |
| 2,155,119 | 4/1939 | Ebner..........................23/1 R |
| 1,213,887 | 1/1917 | Krause...................23/1 B UX |
| 3,231,413 | 1/1966 | Borquin.....................117/100 |

*Primary Examiner*—John J. Camby
*Attorney*—Jordan B. Bierman and Linda G. Bierman

[57] ABSTRACT

A method for the continuous treatment of material, namely separation of solids dissolved or suspended in a liquid or treatment of humid or dry solid, comprising atomizing the material and contacting it with hot gas to cause decomposition, calcinating or drying, said hot gas being in a zone and forming a turbulent layer between two oppositely flowing currents of gas, at least a major portion of the atomized material passing through the turbulent layer, and a portion of the gas containing the material being withdrawn.

5 Claims, 3 Drawing Figures

PATENTED OCT 10 1972

3,696,520

INVENTORS
PETER KLAUS NIEDNER
GERHARD H. DIEZ
BY
Marmoreh and Bierman
ATTORNEYS

PROCESS AND DEVICE FOR THE TREATMENT OF MATERIAL

This application is a continuation-in-part of our co-pending Application Ser. No. 522,918 filed Jan. 25, 1966, now abandoned, and entitled "A Process and Device for the Recovery of Dissolved Metals from Mineral Acids, in the Form of Salts or Oxides".

The invention relates to a process for the treatment of material, namely separation of solids dissolved or suspended in a liquid or treatment of humid or dry solids, e.g. for the precipitation of metals from mineral acids and their recovery in the form of their oxides or salts or for the thermic regeneration of etching or pickling baths. The invention is used for decomposition (e.g. roasting), calcinating and drying of the material. Moreover, the invention also describes a reactor suitable for the thermally treatment of the material employed.

The separation of metal salts from mineral acids by reducing the solubility is known. This reduction of the solubility can be attained by several measures, such as evaporation, concentration or cooling. All such processes have the disadvantage that only a partial removal of the metal salts from the acids is feasible because the remaining mother liquor still is saturated with salts. The extent depends upon the prevailing temperatures.

The separation of dissolved metals from mineral acids by complete evaporation of the water and the acid portion and by the thermic dissociation of the salts formed also is known. This process utilizes a roasting oven which is operated in such a manner that a considerable part of the solid matter formed is separated therein. The oxides thus produced are of spherical or hemispherical shape or else in the form of half moons, all of which contain comparatively large quantities of residual acid relative to their surface areas. Thus, they are difficult to recover in such devices as cyclones.

The processes described are incapable of effecting a separation of metal salts from mineral acids without undesirable decomposition. In the roasting ovens, exact reaction temperatures cannot be maintained. It hence is impossible to separate mixtures of mineral acids from their salts because, at a given reaction temperature, oxides and salts form simultaneously. This is the case, for instance, in pickling solutions which contain sulfuric acid and hydrochloric acid and wherein iron sulfates and oxides form.

It is an object of the invention to modify the process so that a narrow temperature range can be maintained during the evaporation thus averting undesirable decomposition.

Another object of the invention is the use of reactors and their auxiliaries of considerably decreased dimensions.

A still further object is attainment of solids in a shape which enables their separation and recovery under greatly decreased expenditures.

According to the invention, the treatment of the material is accomplished by atomizing the material in a mixture of hot fresh gas, extremely high turbulence being imparted to the gas stream. The material thereby is thermally treated and separated from the gas. In the case of liquids the liquid is evaporated, the solids are separated from the gas stream, and the liquid recovered from the latter. If the liquid consists of an acid the solid-gas mixture is removed from the reactor and separated, e.g., in a cyclone directly connected to the reactor. The acid-carrying gases are conducted to wash towers, likewise directly connected to the reactor, wherein the acid is recovered by absorption.

It has surprisingly been found that this process does not lead to materials which are hollow spheres, hollow hemispheres or half moons, but instead to finely reticulated and very finely grained material of large surface area. This enables a complete separation of dry metal salt and the reaction of metal salt to metal oxide, respectively, within an extremely short time. Moreover, these reticulated particles have the advantage that they can be recovered practically completely in cyclones, due to their surface-active characteristics.

Preferably, the gas is recirculated and the recirculated gas is employed in quantities constituting a multiple of the hot fesh gas. This is of especial importance in the case of heat-sensitive material. The reduction of the temperature difference between the gas and the material normally would lead to overly long minimum dwelling times. However, by carrying out the reaction at high turbulence, the process according to the invention is terminated in an unexpectedly short time, due to the vorticity imparted to the material and high heat transfer coefficients.

When an etching or pickling solution consists of sulfuric acid, hydrochloric acid, iron sulfate, iron chlorides and water, it is desirable that the free hydrochloric acid and the free sulfuric acid evaporate, and that the iron chlorides are thermally decomposed. However, the iron sulfate is merely precipitated as a dry solid because the complete or even partial decomposition of iron sulfate would lead to the formation of $SO_2$ which is difficult to absorb. Experiments have shown that at temperatures below 380° C, drops of sulfuric acid still adhere to the iron sulfate. At temperatures above 420° C, the gas leaving the reactor contains $SO_2$. Hence the importance of keeping within this narrow range. This is advantageously accomplished by mixing the hot fresh gas stream (at a temperature of 1,200° C) with recycled gas (at a temperature of 380° C). The proportions of recycled to fresh gas are so chosen as to yield a temperature of the mixture of not more than 420° C. Thus, the sulfuric acid will evaporate, but neither it nor the iron sulfate will decompose. This prevents the formation of unwanted $SO_2$. The reaction is complete within 0.2 seconds under such conditions.

The invention further enables the setting of the temperature range in the reactor within narrow limits when processing sulfuric acid mixed with other mineral acids in such a manner that the sulfuric acids salts are obtained as sulfates, whereas the salts of the other participating acids are decomposed and recovered as oxides.

It is of great importance to utilize the sensible heat of the gases to be used for the acid recovery for preheating of the mineral acids to be treated. Thus a preconcentration of these mineral acids is obtained. In this instance, a portion of the heat required for carrying out the process can be supplied. If, for instance, the solubility of iron at a given sulfuric acid concentration at 105° is 70 g/l and if the liquid to be treated has an iron content of only 35 g/l, the utilization of the waste heat for the precondensation of the solution effects a 50 per cent reduction of the liquid to be introduced into the reactor. The heat requirements of the process thus decreases correspondingly.

For the absorption of the acid vapors escaping from the reactor, the wash water obtained from etching and pickling baths can advantageously be used. When processing solutions containing nitric acid, it is preferred to include an oxidation of the solution as a first step.

The following examples are intended to be illustrative of the invention in its specific embodiments but are not intended to limit the scope thereof.

EXAMPLE 1

Copper sulfate is to be obtained in water-free crystal form from a solution of the following composition:

| | |
|---|---|
| $H_2SO_4$ | 5% by weight |
| $CuSO_4$ | 17.5% by weight |
| $H_2O$ | 77.5% by weight |

Hot gas at 1,500° C is introduced into the reactor and mixed with return gas at about 380° C in a ratio of 1:20. The resulting gas mixture has a temperature of about 420° C. The solution is atomized into this gas mixture through a nozzle. Within 0.15 seconds in the reactor, the following processes take place in the reactor:
1. The copper sulfate contained in the solution crystallizes, the crystallized copper sulfate is calcined free of water of hydration.
2. $H_2SO_4$ and $H_2O$ evaporate.

The gas leaving the reactor contains the copper sulfate in dust form. The copper sulfate dust is removed from the gas current in a dust removal plant located behind the reactor and collected as the desired product. The gas current is fed to an absorption tower in which the sulfuric acid is condensed.

$FeSO_4 . 7H_2O$ (wet, highly corrosive iron sulfate heptahydrate) can be calcined to an easily storable monohydrate ($FeSO_4 . H_2O$) by separation of 6 $H_2O$ molecules in the same manner as set forth in Example 1. Such material is suitable as a binder for the pelletization of iron oxide or for processing to sulfuric acid. Iron sulfate hepta-hydrate is obtained in the preparation of titanium ores and in the pickling of steel with sulfuric acid.

Also, magnesium chloride-hexahydrate ($MgCl_2 . 6H_2O$) can be calcined from spent liquors of the potash industry to the dry dihydrate ($MgCl_2 . 2H_2O$) with separation of $4H_2O$ molecules in the foregoing manner. Due to the short time in the reactor, the danger of hydrolysis and decomposition to magnesium oxide is greatly reduced. Iron chloride-tetrahydrate can also be produced this way in anhydrous form.

In addition, the calcination of aluminum chloride hexahydrate ($AlCl_2 . 6H_2O$) to the monohydrate ($AlCl_3 . H_2O$) by separation of $5H_2O$ molecules can be carried out in the same manner. This compound is used as a starting material for catalyst carriers and dehydrating agents.

EXAMPLE 2

Magnesium chloride free of water of crystallization is to be obtained from a solution of the following composition:

| | |
|---|---|
| $MgCl_2$ | 31% |
| $H_2O$ | 69% |

Since magnesium oxide is undesired, splitting of magnesium chloride into magnesium oxide and hydrochloric acid must be avoided. Tests showed that the production of anhydrous magnesium chloride must take place at a temperature of about 350° C and with a maximum reaction period of approximately 0.1 sec., if the formation of magnesium oxide is to be avoided. In all reactors known so far in the industry, the stay period is over 1 second. For this reason they are not suitable for this job.

Hot gas at 1,000° C is introduced into the reactor and mixed with return gas at 400° C in a ratio of 1:11. The resulting gas mixture is introduced into the reactor and the $MgCl_2$ solution atomized therein. The ratios are balanced such that an end temperature of 350° C is obtained. Within 0.1 seconds the desired drying takes place. The gas leaving the reactor contains the anhydrous magnesium chloride in dust form. THe latter is removed from the gas current in the dust removal plant and collected as the desired product.

Example 3

Chloride-free magnesium oxide is to be obtained from a solution of the following composition:

| | |
|---|---|
| $MgCl_2$ | 31% by weight |
| $H_2O$ | 69% by weight |

Hot gas at about 1,800° C is introduced into the reactor and mixed in the mixing nozzle with return gas at approximately 700° C in a ratio of 1:10. The resulting gas mixture has a temperature of bout 400° C. Into this gas mixture is atomized the solution of magnesium chloride and water. The desired reaction takes place within 0.2 seconds. The gas leaving the reactor contains chloride-free magnesium oxide in dust form. The latter is collected in the dust removal plant.

EXAMPLE 4

Chloride-free magnesium oxide is to be produced from magnesium chloride powder according to Example 2.

Hot gas at about 1,800° C is introduced into the reactor and mixed in the mixing nozzle with return gas at about 700° C in a ratio of 1:10. The resulting gas mixture has a temperature of about 400° C. Into this gas mixture the magnesium chloride powder is injected through a dosing device. The desired reaction takes place within 0.2 sec. The gas leaving the reactor contains the chloride-free magnesium oxide in dust form which is collected in the dust removal plant.

Magnesium chloride dihydrate can be processed further to high-purity magnesium oxide with regeneration of hydrochloric acid, according to the following formula:

$$MgCl_2 . 2H_2O \rightarrow MgO + 2HCl + H_2O$$

Similarly, iron sulfate monohydrate (dry) can be roasted to iron oxide with recovery of sulfuric acid by this method in accordance with the following equations:

I. $2FeSO_4 \cdot H_2O \rightarrow Fe_2O_3 + SO_2 + SO_3 + 2H_2O$

II. $2H_2O + SO_2 + SO_3 + \frac{1}{2} O_2 \rightarrow 2H_2SO_4$

Kieserite can be similarly roasted to magnesium oxide and sulfuric acid produced according to the equations:

I. $MgSO_4 \cdot H_2O \rightarrow MgO + SO_2 + \frac{1}{2} O_2 + H_2O$

II. $SO_2 + \frac{1}{2} O_2 + H_2O \rightarrow H_2SO_4$

EXAMPLE 5

An iron-free regenerated pickling bath is to be obtained from a spent pickling bath of the following composition:

| | |
|---|---|
| $FeCl_2$ | 15% by weight |
| HCl | 7% by weight |
| $H_2O$ | 78% by weight |

Hot gas at about 1,000° C is introduced into the reactor and mixed with return gas at 350° C in a ratio of 1:11. The resulting gas mixture has a temperature of about 400° C. Into this gas the solution is atomized in such an amount that an end temperature of 350° C is obtained. The desired drying takes place within 0.1 seconds.

The gas leaving the reactor contains the iron oxide ($Fe_2O_3$) formed in the reaction in dust form which is removed from the gas current in the dust removal plant. The free and combined hydrochloric acid contained in the pickling bath is present in the roasting residue in gaseous form and is recovered in an absorption tower by adiabatic absorption with water from the roasting gas.

Likewise, magnesium chloride solution ($MgCl_2$) can be reacted from spent liquors of the potash industry to form high purity magnesium oxide with recovery of hydro chloric acid. Reaction temperature: 600° C.

The reactor for the execution of the process consists of an axially symmetrical vertical chamber, either cylindrical or in form of a downwardly tapering truncated cone, with a gas inlet in the form of a nozzle at its bottom. The latter simultaneously serves to mix the recirculated gas with the fresh gas. Above the gas inlet, the acid is introduced, and thereabove suspended matter, i.e., solid bodies, is present which serves to impart to the gas stream the required turbulence. Substantially at the top, disposed laterally, the outlet for the solid-gas mixture is disposed. The suspension plates opportunely are disposed between perforated plates.

A device is known serving as a mixer for gaseous liquid or solid matter, wherein at least one of the materials to be mixed is introduced with a twist or spin into the mixing chamber which is enlarged in the main stream direction. This effects that one of the materials, from the time of its entry, flows along the chamber walls up to the outlet, where a portion turns back inwardly and flows back substantially along the axis approximately to the inlet. Between the upturning and returning gas streams, a strong turbulence is created. Surprisingly, in a similar manner the mineral acid can be concentrated when, according to a further embodiment of the invention, the gas supply is directed at the lower end of the reactor near the rotational axis whereby the shape of the chamber and the twist imparted to the hot gas stream are tuned to each other in such a manner that a return flow of the gas occurs near the chamber's axis creating layers of extreme turbulence between the upstreaming and returning gas. This enables not only heating to a closely limited temperature range, but also a large throughput of material. Moreover, an axially symmetrical downwardly tapering chamber can be of extremely small size for a given throughput, as compared to other heating and/or heat exchange devices.

In the accompanying drawings constituting a part hereof, and in which like reference characters indicate like parts, FIG. 1 is a flow diagram of the reaction system;

Figure 1:
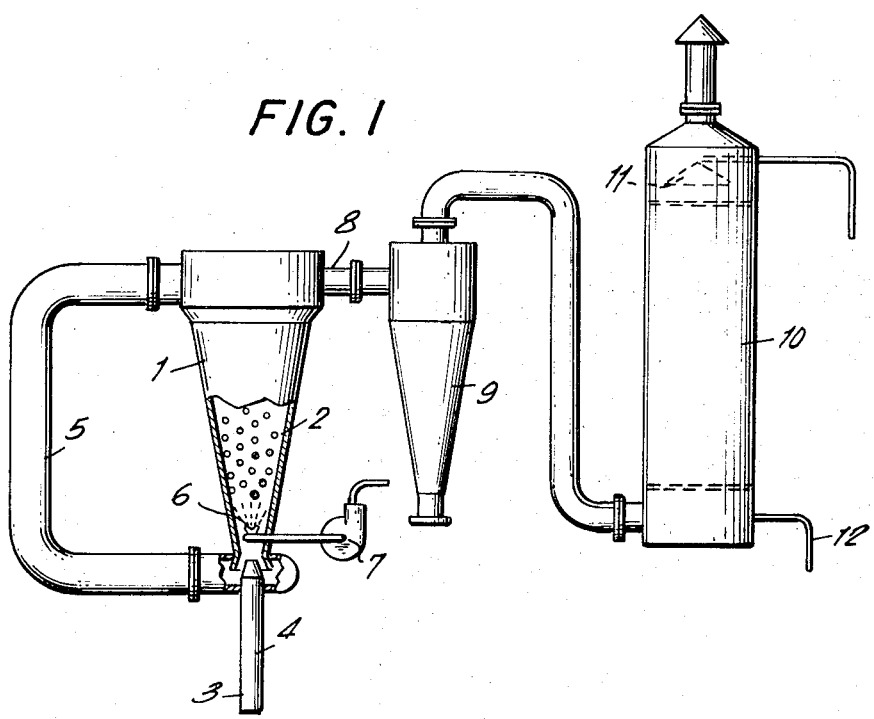
Figure 2:
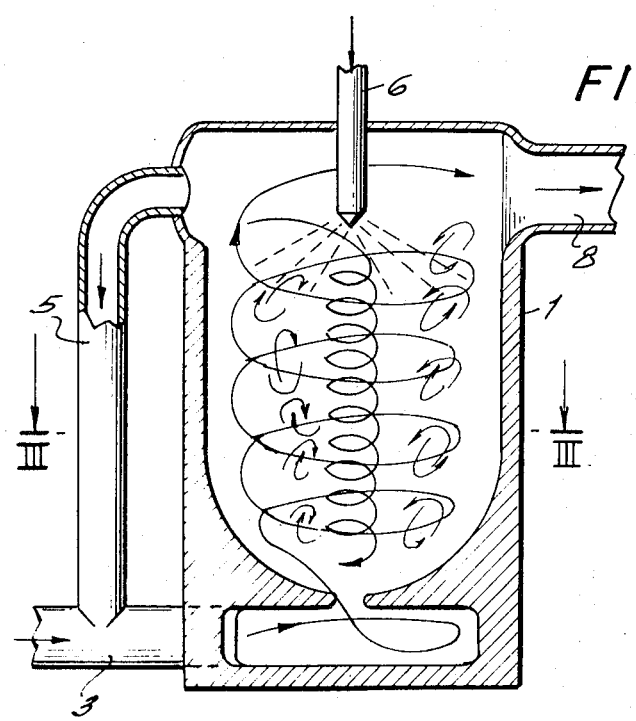
FIG. 2 is a cross section of one form of the reactor.
Figure 3:
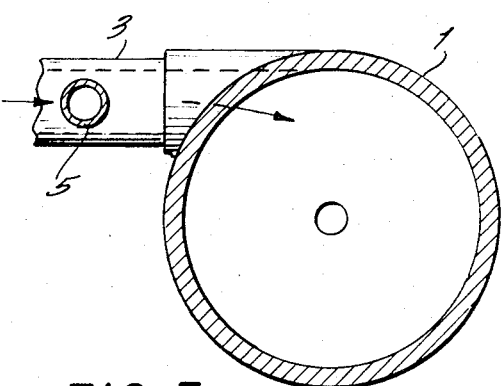
FIG. 3 is a cross section along line III — III of FIG. 2.

Reactor chamber 1 is in the shape of a truncated cone. The hot fresh gas having, e.g., a temperature of 1,400° C, coming from a conventional source (not shown in the drawing) is supplied through injector 3 and is mixed in mixing nozzle 4 with recirculated gas which returns from the reactor by way of conduit 5. Suspended bodies 2 serve to create high turbulence and to prevent the encrustation of solid matter on the reactor walls. The turbulence can be controlled at will by given gas velocities and by suitably selecting the diameter and volume density of the suspended bodies.

The gas to be recirculated leaves the reactor at its upper end through conduit 5. The liquid is introduced into reactor 1 by pump 7 through nozzle 6 within the area of the vertical axis of chamber 1. The solids-gas mixture leaves the reactor by way of outlet 8 and enters cyclone 9 wherein the main portion of the solids is separated. If desired, a ceramic filter (not shown) can be connected to cyclone 9.

The acid leaves cyclone 9 through its head and is introduced into an absorption tower 10, filled with a suitable absorption liquid through nozzle 11. After absorption has occurred, the recovered acid is removed from tower 10 through conduit 12 which returns the acid to its desired purpose, e.g., a pickling or etching bath, an ore dressing plant, or to storage for further disposition.

As mentioned above, wash water obtained in the neutralization of etched or pickled substances can readily be used as absorbent for the acid. In this manner, the recovered acid can partially or completely be returned to the pickling or etching process, and the acid absorbed by the wash water thus is not wasted.

The novel process according to the invention is suitable for the precipitation of metal salts from acid solutions without thermally decomposing a portion of these salts. With the processes hitherto known, it for instance is impossible to completely remove iron sulfate from sulfuric acid solutions because of the danger that even with very slight overheating of the crystallizing iron sulfate and monohydrate a partial decomposition of the sulfate occurs. For this reason, the practice had been limited to evaporating a part of such solutions and to filtering the crystallized iron sulfate-monohydrate from the remaining concentrated solution.

In contradistinction, the process and device according to the invention succeeds in producing large quantities of dry and substantially crystal water-free iron sulfate while no damaging $SO_2$ is present in the gases.

Any suitable gas may be used in the process according to the invention.

What is claimed is:

1. A method for continuous treatment of solids dissolved or suspended in a liquid, or treatment of humid or dry solids, comprising atomizing said solids and contacting them with hot gas in a vertical, axially symmetrical reactor to cause decomposition, calcinating or drying of said solids, introducing said hot gas in a circular direction near the lower end of said reactor and causing said gas to follow a helical path upward in said reactor, whereby a space of reduced pressure adjacent the axis of said path is formed, directing a portion of said hot gas back into said space toward said lower end, feeding said solids into said reactor centrally near said upper region, forming a turbulent volume between two oppositely flowing currents of said gas, passing a major portion of said solids through said turbulent volume in a time less than one second, the other portion of said hot gas containing the thermally treated solids being withdrawn near said upper end, the ratio of said introduced hot gas to said return gas portion being from substantially 1:10 to substantially 1:20.

2. A method according to claim 1 including the step of causing said atomized material to remain in said space for 0.1 to 0.3 seconds.

3. A method according to claim 1 further comprising maintaining a predetermined narrow temperature range in said zone by mixing appropriate quantities of fresh and recirculated hot gas.

4. A method according to claim 3 wherein said material is iron sulfate dissolved in sulfuric acid, said range being about 380° C to about 420° C, whereby adherence of residual sulfuric acid and decomposition to $SO_2$ are prevented.

5. A method according to claim 3, wherein said solids are in the form of a metal salt and including the steps of dissolving said salt in an acid and preventing adherence of residual acid and decomposition to metal oxide, said range being about 380° C to about 420° C.

* * * * *